United States Patent [19]

Miller

[11] Patent Number: 5,004,275
[45] Date of Patent: Apr. 2, 1991

[54] CLAMP

[75] Inventor: Jack E. Miller, Houston, Tex.

[73] Assignee: International Clamp Company, Houston, Tex.

[21] Appl. No.: 364,628

[22] Filed: Jul. 13, 1989

Related U.S. Application Data

[60] Division of Ser. No. 237,308, Aug. 26, 1988, Pat. No. 4,895,397, which is a continuation of Ser. No. 840,329, Mar. 14, 1986, Pat. No. 4,790,058.

[51] Int. Cl.$^5$ ............................................. F16L 21/06
[52] U.S. Cl. ................................... 285/373; 285/286; 285/419; 285/379; 277/181; 277/192
[58] Field of Search ................ 285/15, 286, 292, 373, 285/419, 910, 379; 277/181, 184, 192

[56] References Cited

U.S. PATENT DOCUMENTS

| | | | |
|---|---|---|---|
| 982,028 | 1/1911 | Austin | 285/373 X |
| 1,913,030 | 6/1933 | Hux | 285/373 X |
| 1,930,194 | 10/1933 | Dillon | 285/373 X |
| 2,352,583 | 6/1944 | Zetterquist | 285/286 X |
| 2,690,193 | 9/1954 | Smith | 285/373 X |
| 2,747,900 | 5/1956 | Smith | 285/286 X |
| 2,839,320 | 6/1958 | Hill | 285/419 X |
| 3,003,793 | 10/1961 | Pitt | 285/373 X |
| 3,024,046 | 3/1962 | Frost et al. | 285/373 X |
| 3,028,180 | 4/1962 | Smith | 285/286 X |
| 3,078,108 | 2/1963 | Smith | 285/373 X |
| 3,396,753 | 8/1968 | Foster et al. | 138/99 |
| 3,926,815 | 12/1975 | McClory | 285/419 |
| 3,954,288 | 5/1976 | Smith | 285/373 X |
| 4,284,298 | 8/1981 | Kaufmann, Jr. | 285/373 X |
| 4,407,514 | 10/1983 | Hausler | 277/192 X |
| 4,417,755 | 11/1983 | Gittleman | 285/373 |
| 4,486,036 | 12/1984 | Storke et al. | 285/253 |
| 4,522,434 | 6/1985 | Webb | 285/373 X |
| 4,530,143 | 7/1985 | Casarcia | 29/407 |
| 4,593,942 | 6/1986 | Loke | 285/253 |
| 4,603,887 | 8/1986 | Mayfield et al. | 285/373 X |
| 4,611,839 | 9/1986 | Rung et al. | 285/373 X |
| 4,652,023 | 3/1987 | Timmons | 285/373 X |
| 4,671,544 | 6/1987 | Ortloff | 285/355 X |
| 4,768,813 | 9/1988 | Timmons | 285/373 |

FOREIGN PATENT DOCUMENTS

| | | | |
|---|---|---|---|
| 43057 | 6/1971 | Australia . | |
| 608456 | 3/1979 | Australia . | |
| 498370 | 12/1953 | Canada | 285/373 |
| 740433 | 11/1955 | United Kingdom . | |

OTHER PUBLICATIONS

Plido Pipe Clamp Catalog.

Primary Examiner—Dave W. Arola
Assistant Examiner—Jeffrey L. Thompson
Attorney, Agent, or Firm—Arnold, White & Durkee

[57] ABSTRACT

A clamp for forming a seal on a pipeline section, the clamp comprising a pair of complementary clamp members to be clamped together, each clamp member having an inner surface with a pair of axially spaced, circumferentially extending circumferential seals, and one clamp member having a pair of circumferentially spaced longitudinal seals which extend axially to bridge the gaps between the opposed circumferential ends of the pair of circumferential seals to define four junction zones where the circumferential seals and the longitudinal seals abut, and retention means at each junction zone to connect the circumferential and longitudinal seals together in the retention zones, and at the same time connect the seals to the clamp member at the junction zones. The clamp includes corner seals to provide backup sealing for the junction zones. The clamp includes heat protection grooves to protect certain of the clamp seals. The clamp may include a pipe branch to provide a hot tapping facility. Embodiments of the clamp have an optimized body design to provide for weight minimization.

27 Claims, 5 Drawing Sheets

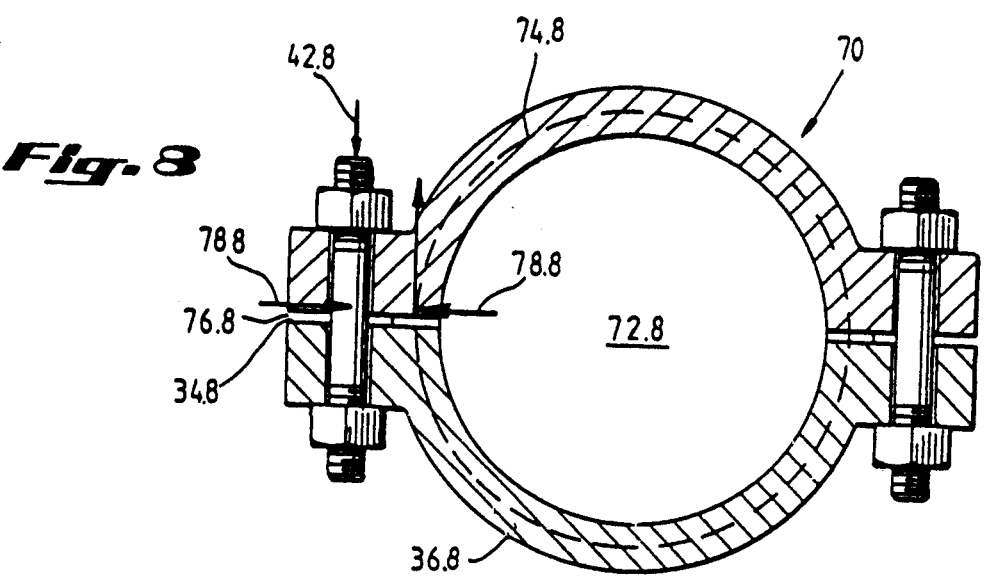
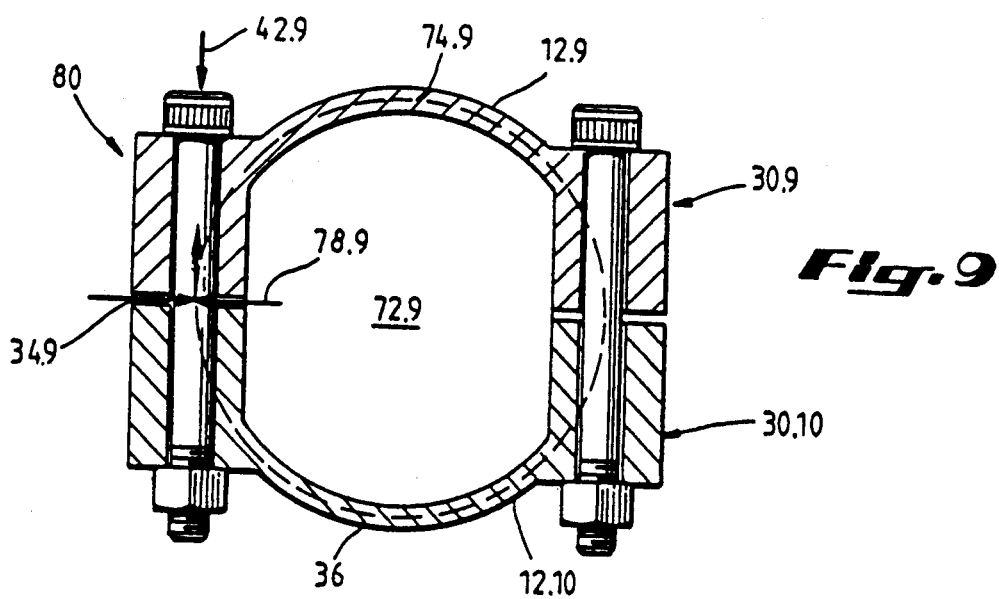
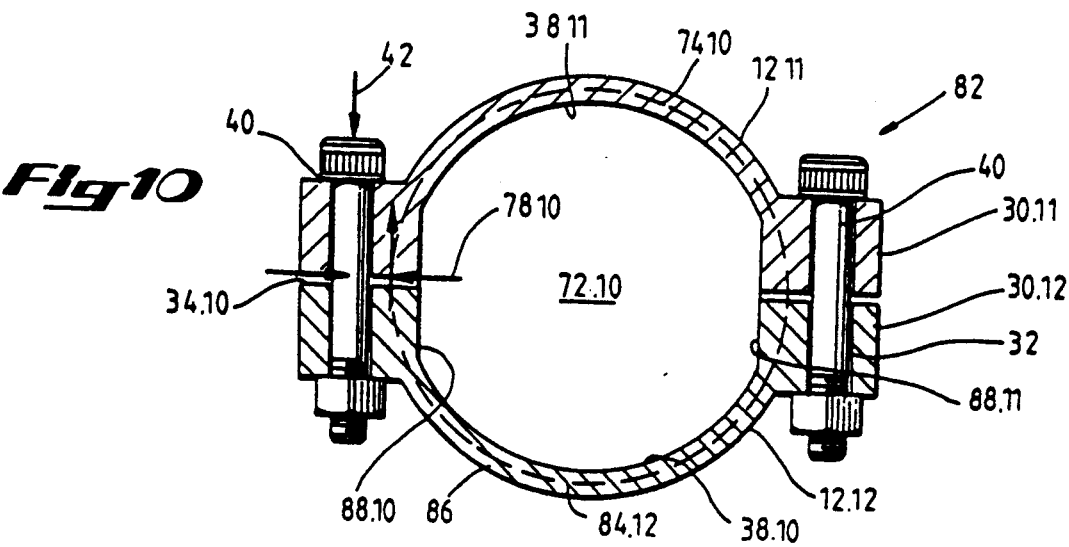

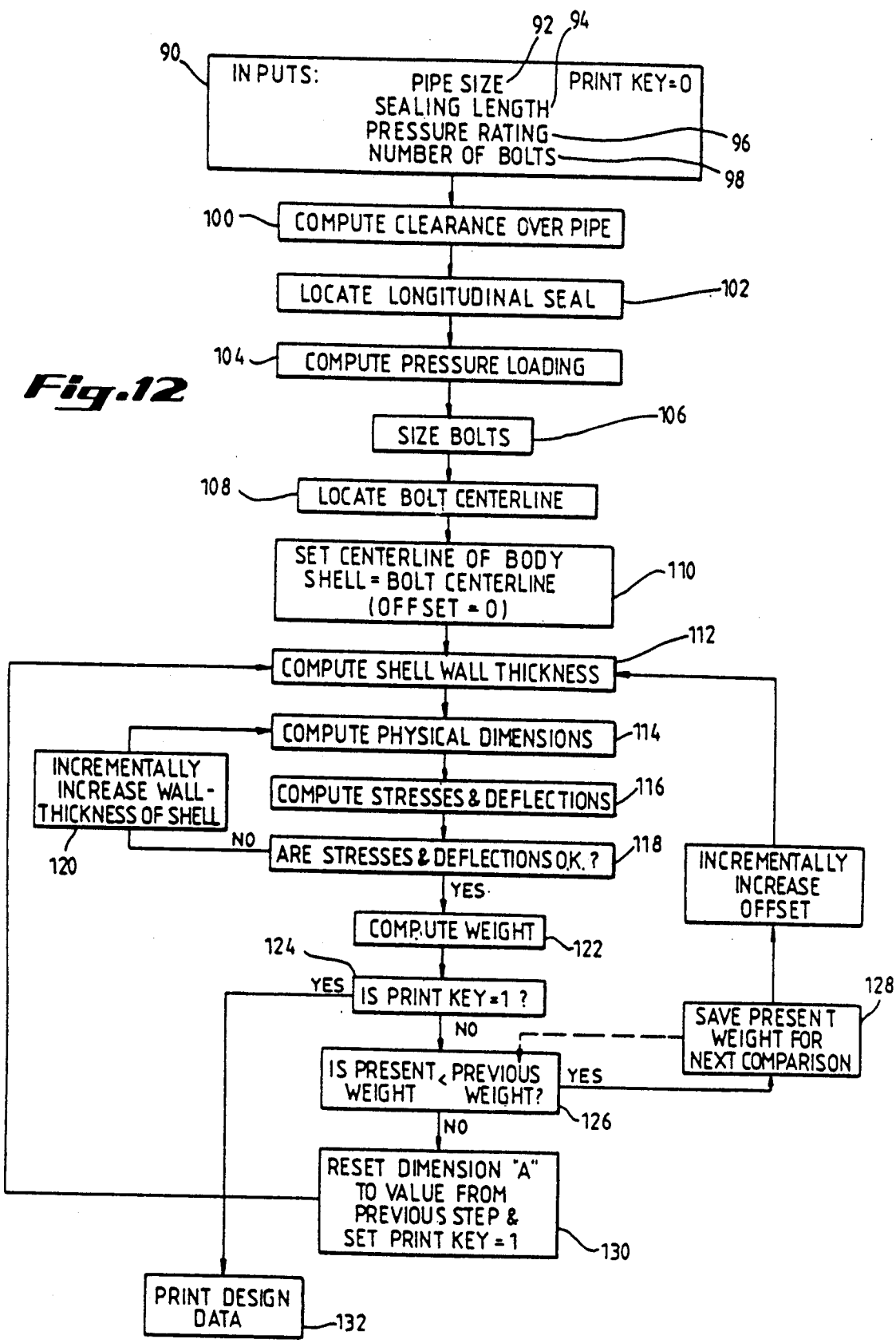

CLAMP

The present application is a divisional of U.S. Ser. No. 237,308, filed Aug. 26, 1988 which is a continuation of U.S. Ser. No. 06/840,329, filed Mar. 14, 1986, now U.S. Pat. No. 4,790,058.

This invention relates to a clamp. More particularly this invention relates to a clamp for use in forming a seal on a pipeline section. The clamps of this invention are particularly adapted to serve as repair clamps for use in repairing leaks or weakened zones in high pressure pipeline sections. They may also be used to reinforce pipeline sections in weakened zones or in zones which are vulnerable to damage or to additional stress.

Known high pressure pipeline repair clamps are generally expensive because of the high cost of manufacture, are frequently not as reliable as required by the function which they serve, and are often difficult and clumsy to install.

Clamps which are intended to be mounted onto existing pipeline sections, such as, for example, repair clamps, branch clamps, tapping clamps, and the like, comprise separate components which can be fitted together to complete the clamp. Such clamps are therefore usually split clamps which are split into circumferential sections to enable them to be mounted onto a pipeline section. The seals of such clamps thus cannot be monolithically constructed to surround the pipe circumference. Difficulties are therefore often encountered in locating seals in the clamp members or sections of such pipeline clamps. This is in contrast to full annular seals which can often be retained in seal grooves simply by interference. The seals in the components of such pipeline clamps, experience significant loads as the clamp is installed on a pipe section due to the interference which is necessarily designed in the seals. The most prominent forces exerted on the seals tend to occur at the split seams between the clamp members where friction from squeezing and sliding the seals into position tends to slide the seals out of position during installation.

Attempts have been made to retain the seals of such clamps, particularly of repair clamps, in position by using retainer rings which are mounted on the clamp members and compress portions of the seals onto the bodies of the clamp members. These retainer rings can be effective at retaining the seals in position. However, the retainer rings can sometimes damage the seals. Sometimes the retainer rings can be so effective at seal retention that the seals do not have sufficient freedom of movement necessary to fill imperfections in a pipeline surface or to engage sealingly with adjacent or abutting seals. Other attempts have been made to provide dovetail seal grooves in the repair clamp member to locate correspondingly shaped seals. Dove tail seal grooves require special machining during manufacture and are more costly to manufacture due to the additional detail of cutting the reverse angle groove walls.

Where seals are located securely on clamp members of repair clamps, a large effort is often necessary to replace the seals. Many users of pipeline repair clamps use them temporarily. When conditions permit, the pipeline is permanently repaired and the repair clamp is recovered for future use. This requires replacement of the used seals with new seals. It is desirable, therefore, that repair clamps have seals which are readily replaceable when desired. Where the seals are difficult to replace, users often discard the entire clamp rather than incur the cost charged for refurbishing such repair clamps.

It is an object of one aspect of this invention, to provide a clamp, particularly a pipeline repair clamp for repairing high pressure pipelines, which can overcome or at least reduce the disadvantages of the prior repair clamps discussed.

In accordance with one aspect of this invention, there is provided a clamp for forming a seal on a pipeline section, the clamp comprising at least two complementary clamp members to be clamped together on a pipeline section to complete the clamp; each clamp member having an inner surface with a pair of axially spaced, circumferentially extending circumferential seals; at least one clamp member having at least one longitudinal seal which extends axially to bridge the gap between a pair of circumferential seals and define two junction zones where the two circumferential seals and the longitudinal seal abut; and retention means at each junction zone, each retention means penetrating at least one of the seals to connect the seals together in the junction zone.

The clamp is particularly suitable as a high pressure repair clamp for repairing leaks or defects in high pressure pipeline sections.

Each retention means may preferably be connected to a clamp member to connect the seals with which it is engaged, to such clamp member.

In a preferred application of the invention, each retention means extends through one of the seals and penetrates the adjacent seal to thereby connect the two seals together at that junction zone.

The retention means may be in the form of various types of mechanical devices which can positively connect abutting seals together to form a seal, for example, nails, pins, brads or shafts. In a preferred embodiment of the invention the retention means comprises a selftapping screw which extends through one seal and is screwed into the adjacent seal. In this embodiment of the invention, the clamp member preferably has bores through which the screws extend to thereby secure the seals with which they are engaged, in position on the clamp member.

The seals may be located in appropriately positioned seal grooves in the clamp members. The clamp may include one or a plurality of additional retention means which connect the seals to their respective clamp members in one or a plurality of connection zones to thereby retain the seals in position.

In an embodiment of the invention, the clamp members may have heat protection grooves in their inner surfaces between selected peripheral edges of the clamp members and selected seals, to protect the seals from heat flow towards the seals during welding of such peripheral edges during use.

The clamps of this invention may have corner seals positioned to abut the junction zones and provide secondary sealing for the junction zones during use.

The clamp may have one clamp member with a pipe branch extending therefrom. In this embodiment of the invention, the clamp member may have an annular gasket to seal a peripheral zone proximate the pipe branch to a pipeline section when the clamp is sealingly engaged with such a pipeline section. In this aspect of the invention, the clamp may also have one clamp member with a test port.

Users of high pressure pipeline repair clamps sometimes prefer to weld the clamps onto a pipeline section subsequent to repair of the leak with the clamp. This makes the clamp a permanent fixture of the pipeline and eliminates the dependence of sealing integrity on the elastometric seals of the clamp. The usual procedure is that the repair clamp is installed to seal the leak. Then the area is cleared of any combustible products which may have leaked from the pipeline. The pipeline is brought up to steady flow conditions to dissipate welding heat and thereafter the seams and openings of the clamp are welded.

Seal welding of a repair clamp does present certain dangers. If the heat produced by welding conducts to the seals in sufficient quantity to exceed the temperature capabilities of the seal material, the seal material may fail prior to completion of the seal welding procedure. If the pipeline product is combustible, this can create a hazard.

Attempts have been made to combat this problem by adding excess steel to the axial ends of the clamp to absorb the welding heat when those axial ends are welded to the pipeline section, and thus prevent excessive quantities of heat being conducted to the seals. Usually the amount of added metal is approximately three inches on each axial end. This added metal is heavy, adds to the cost of the product, and is wasteful where seal welding is not employed.

It is accordingly an objective of a further aspect of this invention, to provide means for overcoming or reducing the problem presented by heat conduction to seals during seal welding of repair clamps and other clamps.

In accordance with this aspect of the invention, there is provided a clamp for a tubular member, the clamp having an inner wall surface, having a sealing groove in the inner wall surface to house seal means, the sealing groove being spaced from a peripheral zone of the clamp, and the clamp having a heat protection groove, the heat protection groove being provided in the inner wall surface between the peripheral zone of the clamp and the sealing groove to interrupt heat flow from the peripheral zone to the sealing groove to thereby partially protect seal means when housed in the sealing groove during use, against heat flow from the peripheral zone during welding thereof.

The invention further extends to a clamp for pipeline repair, the clamp comprising a plurality of clamp members to be clamped to each other about a pipeline to be repaired to complete the clamp, each clamp member having a sealing zone for receiving seal means, and each clamp member having a heat protection groove between the sealing zone and a peripheral zone of the clamp member to interrupt heat flow from the peripheral zone to the sealing zone during welding of the peripheral zone and thereby provide protection of seal means when positioned in the sealing zone. Moreover, heat protection grooves may be extended axially to protect the circumferential seals and the longitudinal seals, or a portion of the longitudinal.

The heat protection grooves may have depths generally corresponding to the depths of the sealing grooves. They may, however, have greater or lesser depths depending upon the configuration of the clamp members and the proposed welding conditions. If desired, insulation material may be housed or fixed in the heat protection grooves to provide further heat insulation.

Since repair clamps require both circumferentially extending and axially extending seals, and since repair clamps comprise two or more clamp members which are clamped together to complete the repair clamp on a pipeline section, a plurality of seal junction zones occur where separate seals abut. These are the most sensitive areas for sealing reliability in leak repair clamps.

These junction zones are generally areas where seal-to-seal contact occurs. In other areas of the clamp in accordance with this invention, the seals can generally be arranged so that seal-to-metal contact is utilized. Where the seals are in direct contact with metal, seal performance is very predictable and reliable. However, extensive seal-to-seal contact can tend to be unreliable.

It is a further object of this invention to provide means for improving the reliability of sealing in such junction zones.

In accordance with this further aspect of the invention, there is provided a clamp for forming a seal in a pipeline section, the clamp comprising at least two complementary clamp members to be clamped together on a pipeline section to complete the clamp, each clamp member having an inner surface with a pair of axially spaced, circumferentially extending circumferential seals, at least one clamp member having at least one longitudinal seal which extends axially to bridge the gap between the ends of a pair of circumferential seals and define two corner junction zones, and at least one clamp member having at least one corner seal positioned to abut a junction zone during use and provide back-up sealing for the junction zone when the clamp is completed during use.

The clamp preferably has a corner seal positioned at each corner junction zone to embrace the outwardly directed edges of the seals in the corner junction zones.

The corner seals are preferably located in corner recesses provided in the clamping members to allow an appropriate degree of compression of the corner seals during use.

Particularly, for example, when using conventional high pressure sealing materials, the corner recesses may be such in relation to the designed for compression of the seals, that the corner seals can be compressed by 30 or 40 percent during completion of the repair clamp.

The corner seals are preferably employed for very high pressure applications. They will tend to be less important or unnecessary in medium or high pressure applications.

The clamp preferably includes retention means to retain the corner seals in position on the clamp members.

In an embodiment of the invention, the retention means may comprise the retention means used for retaining the circumferential and longitudinal seals in position.

Pipeline repair or leak repair clamps are often used in hot-tapping and line-stopping applications. Such variations are often used in line maintenance and construction projects as well as in those cases where pipeline leaks are to be repaired or pipe sections are to be replaced.

Prior art clamps of this type are generally simply a leak repair clamp with a pipe branch attached to extend from the clamp.

These prior art branch clamps have certain disadvantages and create certain concerns.

First there are concerns about the reliability of the seals and the high cost of failure in the event of leakage.

Often no leak exists (at the tap location) prior to tapping into the pipeline. A fitting may therefore be successfully installed with no indication of a leak since the pipeline has not yet been tapped. However, after the line is tapped, pipeline pressure is applied to the interior of the fitting. At this critical time a leak may be observed for the first time. Since a hole, which can be of a significant size, has by then been bored through the pipe, the fitting cannot practically be removed, and no convenient method exists to stop the leak. This, therefore, usually necessitates taking the pipeline out of service in order to replace the leaking fitting.

A further concern is based on the fact that, after a tap is effected, the pipeline fluids are free to circulate in the annular space formed between the interior of the tapping fitting or branch fitting, and the outside of the pipe. Pipeline fluids may be corrosive or damaging to seals. Pipelines usually have internal coatings applied to resist the deleterious effects of the pipeline product. However, the exterior of the pipe does not usually have the same protection. It is often, therefore, considered undesirable to have free movement of the pipeline product on a region of the pipeline exterior.

It is accordingly a further objective of this invention, to provide a clamp which can serve as a branch clamp, and which can reduce or overcome some of the discussed advantages.

In accordance with this further aspect of the invention, there is provided a clamp for clamping sealingly onto a pipeline section, the clamp comprising at least two clamp members to be clamped together on a pipeline section to complete the clamp, each clamp member having seal zones for receiving seal means to provide a sealing engagement between the clamp and a pipeline section during use, one clamp member having a pipe branch extending therefrom for the clamp to serve as a tapping saddle or branch clamp, and that clamp member having an annular gasket to be positioned within the clamp member about the inner periphery of the pipe branch for sealing engagement with a pipeline section during use.

The gasket preferably comprises a pliant gasket which can conform closely with the pipeline surface during use, and can isolate the pipe branch zone from the remainder of the interior of the clamp.

In a preferred embodiment of the invention, the gasket comprises a perforated elastomer sheet which is relatively pliant to be tolerant of pipe dimensions and pipe surface defects.

In the clamp of this aspect of the invention, at least one clamp member may include a test port to provide access to the interior of the clamp to a zone between the annular gasket and the seal means of the clamp members during use.

The seals and annular gasket used in the clamps of this invention, may be made of any conventional or suitable materials which can serve the required purpose. There are a number of standard materials of different types which are commercially available. Appropriate seals can be purchased off the shelf, can be extruded to specification, or can be molded to specification.

Various synthetic rubbers are, for example, available which are suitable for seals in the clamps of this invention.

For line temperatures below about 300° F. buna nitrile synthetic rubbers are generally preferred. For temperatures at 300° F. or higher, fluoro elastomers, such as those for example available under the trademark "VITON" are currently preferred.

Silicon seals are also sometimes used.

The particular seal material depends on the chemical composition in the pipeline, the operating temperature, and the operating pressure. From these parameters, persons of ordinary skill in art can readily select appropriate seal materials from those commercially available, and can readily design the dimensions and compression ratios from the ratings which are available for various applications.

Seal materials are graded bY a standard, referred to as a durometer reading, which gives an indication of the stiffness of the rubber.

The preferred seal material for average conditions for a repair clamp of this invention, is a buna nitrile seal operating at a temperature of less than 250° F. For an ANSI class 600 rating (that is 1,480 psi at ambient temperatures) a durometer reading of 70 to 75 is preferred.

The materials from which the clamp members are made, are well-known to persons of ordinary skill in the art. They may be selected from the various steels which are listed in available piping and pressure vessel codes.

Where welding will be employed for the clamp of this invention, the material of the clamp must be selected that neither the material of the clamp nor the material of the weld will be compromised during welding.

The clamp materials may for example comprise carbon steel casting ASTM A-216-grade WCA, WCB or WCC. Applicant's presently preferred grade is grade WCC.

While the clamps of this invention can have various applications, they are particularly suitable for and adapted for use in pipeline repair and high pressure pipeline repair or sealing operations.

A further concern is based on the fact that the clamps for use in forming a seal on a pipeline section, particularly where the pipeline to be clamped is of large diameter, are quite heavy and additionally, quite bulky. It has generally been thought that in order to combat the high pressures and temperatures associated with pipeline repair clamps, it was necessary to add additional weight to the clamp. Clearly, however, such weight costs money. Material costs are significant to the cost of the product. Transportation charges are directly related to shipping weight. Additionally, installation is made more difficult by the high weight.

Accordingly, the present invention also provides clamps of reduced weight which are rated to withstand the same at higher operating pressures. This weight reduction, while retaining or increasing the clamp performance, is due to a reduction in bending loads in the clamp body that result from internal pressure. Such reduction in bending loads is achieved by adjusting the primary path of tensile loads in the clamp body and in the bolts.

The primary tensile loads associated with a pipe clamp having a pair of complementary clamping members to be clamped together to form a clamp body, are defined radially around a tensile load center line of the clamp wall and laterally along a bolt force center line defined by the bolt positioning on the bolting flanges. Therefore, by adjusting the relative positioning of the two tensile load forces, that is, the bolting force center line and the wall tensile load center line, clamps may be designed which achieve a minimized weight yet which meet at least minimum acceptable criteria for clamp wall thickness, clamp body bending stress and bolt bending stresses.

The wall tensile load center line, commonly referred to herein as a wall center line may generally be defined as being projected along a radial path extending from a mid point between the inner and outer surfaces of the clamp walls, the radial path generally corresponding to the curvature of the curved inner wall surface. In the completed clamp, that is, a clamp in a closed or clamped position, the wall center line may generally be envisioned as an annular tensile load defined radially around a central point, the central point generally being defined as the axial center of the clamp body bore, alternatively, the axial center of the pipe to be clamped.

The bolt force, or tensile load, center line is generally defined by the bolt hole or bolt bore, more specifically, the axial center of the bolt hole or bore.

It will be appreciated that adjustment of the bolt force center line with respect to the wall center line may result in a clamp body cavity with a non-circular bore. Pipes are nevertheless sealing engaged by the present clamps through the use of axially spaced sealing flanges which extend from the clamp walls and have radii roughly corresponding to the radius of the pipe.

Embodiments of the invention are now described by way of example with reference to the accompanying drawings.

In the drawings:

FIG. 8 shows an end view in the axial direction of a typical prior art clamp, with arrows indicating the offset of clamp body tensile loads;

FIG. 9 shows a sectional view of a clamp having a zero off-set between the wall centerline and the bolt force centerline;

FIG. 10 shows a sectional end view in the axial direction of a preferred embodiment of repair clamps produced in accordance with the present invention, demonstrating an optimized off-set and non-circular clamp bore;

FIG. 12 illustrates a logic circuit or flow chart for data processing useful in the minimization of clamp weight.

Figure 1:
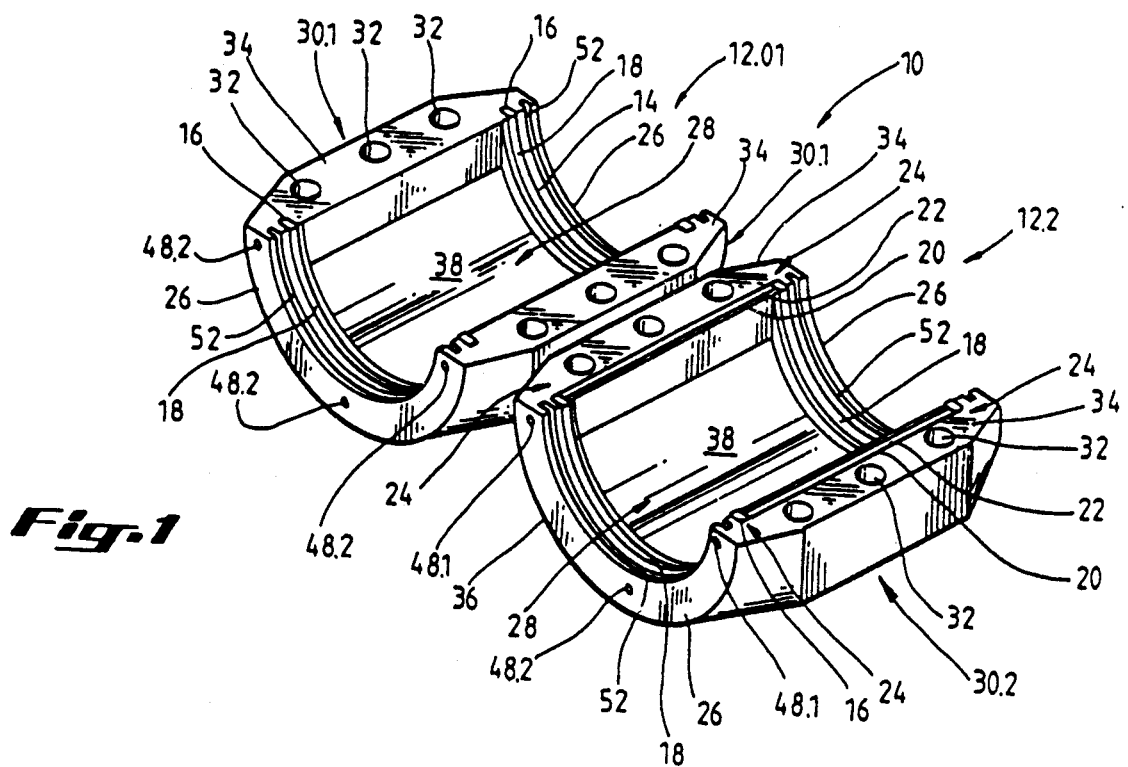
FIG. 1 shows a three dimensional view of one preferred embodiment of a repair clamp for forming a seal on a pipeline section, with the clamp in its unassembled condition.
Figure 2:
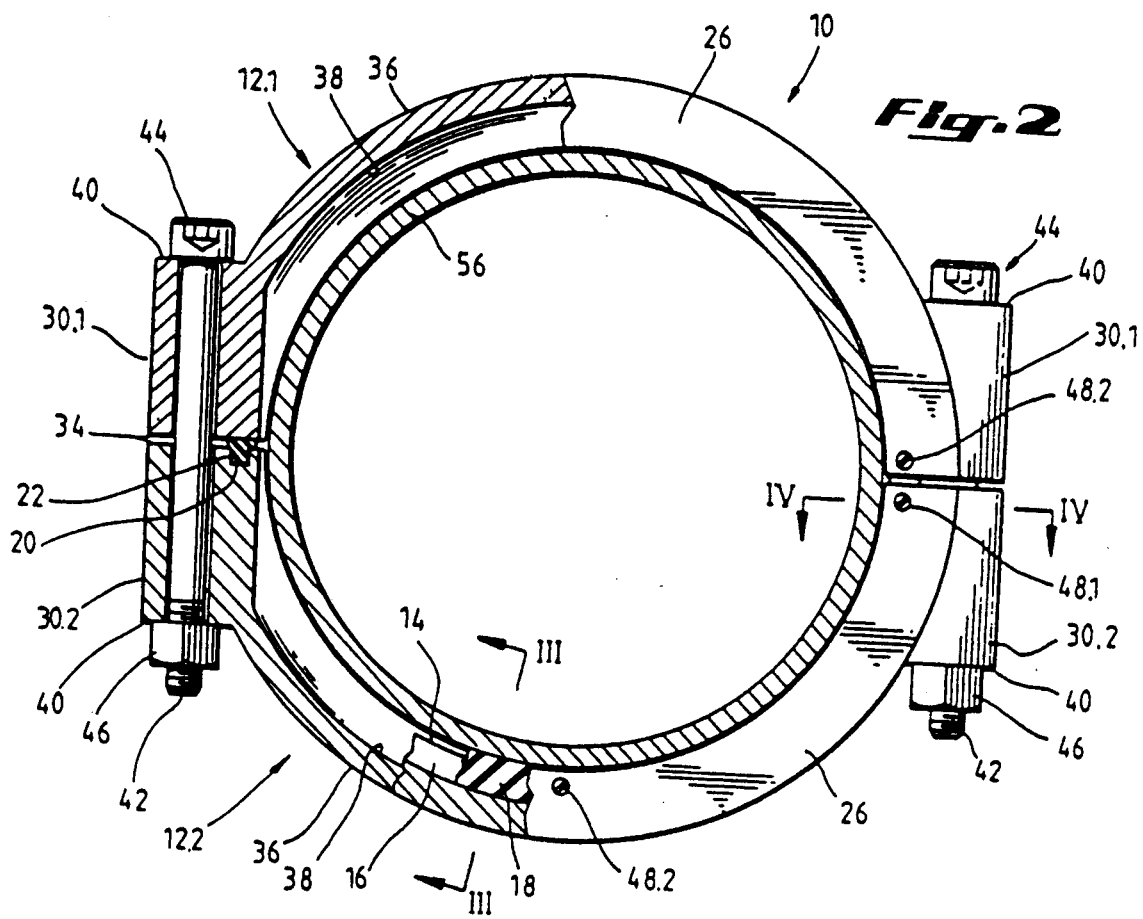
FIG. 2 shows a partly sectional, partly broken away, end view in the axial direction of a preferred embodiment of the rePair clamp of FIG. 1, in its completed or assembled condition on the pipeline section or a section of some hollow tubular member.

With reference to FIGS. 1–4 of the drawings, reference numeral 10 refers generally to one preferred embodiment of a clamp in accordance with this invention for forming a seal on a pipeline section.

The clamp 10 is in the form of a repair clamp for the repair of high pressure pipeline sections to stop leaks or repair defects.

The clamp 10 comprises two complementary clamp members 12.1 and 12.2 which are designed to be clamped together on a pipeline section to complete the clamp 10.

Each of the clamp members 12 (that is 12.1 and 12.2) has inner flange surfaces 14 which are generally semiannular.

The clamp members 12 are generally semi-annular because two clamp members 12 are used to complete the clamp 10. It would be appreciated, however, that more than two appropriately shaped clamp members 12 could be used to complete the clamp 10. A pair of clamp members 12 is however the present preferred configuration.

Each of the flange surfaces 14 of the clamp members 12, has a pair of axially spaced circumferentially extending circumferential seal grooves 16 wherein circumferential seals 18 are located. These circumferential seals 18 of each clamp member 12 are thus axially spaced and extend circumferentially. They are provided in the inner flange surfaces 14.

Only one of the clamp members, namely the clamp member 12.2, has a pair of circumferentially spaced, axially extending, longitudinal seal grooves 20.

The longitudinal seal grooves 20 are provided at the circumferentially opposed ends of the circumferential seal grooves 16 and thus of the clamp member 12.2.

Each seal groove 20 has a longitudinal seal 22 positioned therein.

The longitudinal seals 22 abut the circumferential seals 18 to define four junction zones 24.

The inner flange surfaces 14 of the clamp members 12 are defined along the inner peripheries of inwardly extending flanges 26 which are axially spaced from each other to define recesses 28 between the flanges 26.

Each clamp member 12 has a clamp flange or bolting flange 30.1 (for the clamp member 12.1) and 30.2 (for the clamp member 12.2) at the circumferentially opposed ends. The flanges 30 are used for bolting the clamp members 12 together to complete the clamp 10.

Each flange 30 has a plurality of bolt holes or bores 32 for receiving bolts or studs to clamp the clamp members 12 together.

Each flange 30 has a seating face 34.

The seating faces 34 of the clamp member 12.2 have the longitudinal seal grooves 20 provided therein. The longitudinal seals 22 therefore cooperate with he seating faces 34 of the clamp member 12.2 and with he seating faces 34 of the clamp member 12.1 when the clamp 10 is completed on a pipeline section.

Each clamp member 12 has a curved outer wall surface 36 and a curved inner wall surface 38 between the flanges 26. Each flange 30 has a bolt surface 40.

During use the clamp members 12 are clamped together by means of appropriate bolts. In the preferred embodiment illustrated in the drawings, the bolts are in the form of socket head cap screws 42 having socket heads 44. Hexagonal nuts 46 are used with the screws 42.

Since the socket head cap screws 42 are tightened with a male driver key, it is not necessary to provide excess spacing around the bolt head 44. The bolts may thus be spaced more closely to each other, and more closely to the outer wall surfaces 36 of the clamp members 12. This can lead to a significant reduction in the size of the flanges 30 of the clamp 10.

The offset between the bolt or capscrew 42 center lines and the center line of the clamp body, may be minimized for the same reason, leading to less bending loads on the clamp body.

Since the socket head 44 diameters are less than the width across the flat portions of the nuts 46, the flanges 30 are conveniently shaped so that the nuts 46 cooperate with corners formed between the junctions of the bolt surfaces 40 and the outer wall surfaces 36 to prevent the nuts 46 from rotating during installation. This therefore eliminates the need for a back-up wrench during bolt torque procedures.

While socket head cap screws of any conventional materials may be used, the present preferred screws 42 are those produced under ANSI B18.3 which specifies material according to ASTM A-574. The material specification specifies a minimum 0.2% offset yield strength of 153,000 psi and a minimum ultimate tensile strength of 170,000 psi. A minimum elongation (before fracture) of 8% is also specified for the material. Because of the higher strength, the length of pipeline section encapsulated may be increased without using larger bolts or screws 42. Alternatively, the same length may be encapsulated or sealed using smaller bolts. This is important since an increase in bolt size also increases the size and weight of the clamp 10.

The cumulative weight savings which can result from the use of socket head cap screws of high strength, attributable to the weight of the screws 42 and the reduced possible dimensions of the bolting flanges 30, and the concomitent lesser bending loads on the clamp body from an optimized design in accordance with this invention, can provide a weight saving of typically from about 15% to a saving which may be as high as 40% in some cases.

The clamp member 12.2 includes retention means 48.1 which connect the longitudinal seals 22 to the circumferential seals 18 in the four junction zones 24. At the same time, the retention means 48.1 serve to secure the longitudinal seals 22 and the circumferential seals 18 in position to the clamp member 12.2.

Each retention means 48.1 comprises a self tapping screw 48.1 which extends through a bore 50 in the flange 26, which is screwed through the circumferential seal 18, and into the longitudinal seal 22. (As can be seen particularly in FIG. 4.)

Each retention means, or self-tightening screw 48.1, thus positively secures the circumferential seal 18 to the longitudinal seal 22 in the junction zone 24, while at the same time positively locating the junction zones 24 in position on the clamp member 12.2.

The clamp members 12 include additional retention means 48.2 which likewise extend through bores 50 in the flanges 26, and penetrate the circumferential seals 18 in connection zones to connect the circumferential seals 18 to the clamp members 12 in those connection zones.

The additional retention means 48.2 will be provided at spaced intervals along the length of the circumferential seals 18, with the spacing depending upon the diameter of the clamp 10. Receiving bores may be provided at appropriate intervals in the flange 26 to receive the free ends of the retention means 48.2 which pass through the circumferential seals 18.

The embodiment of the invention as illustrated in FIGS. 1-4 of the drawings, provides the advantage that the retention means 48 effectively locates the circumferential seals 18 in position in the seal grooves 16 of the clamp members 12. In addition, the retention means 48.1 secure the ends of the circumferential seals 18 and longitudinal seals 22 together in the critical junction zones 24 to improve the sealing effect in the zones, while simultaneously locating the ends of the circumferential seals 18 and of the longitudinal seals 22 in position in these junction zones.

The seal retention means 48 effectively supports the seals during installation, and does not restrict the seals from filling imperfections in the pipe surfaces during use. Additionally, the seal retention means allows easy replacement of the seals when required.

The use of the retention means 48 in accordance with the aspect of the invention described with reference to the preferred embodiment of FIGS. 1-4, provides several advantages. This aspect of the invention provides simplicity. Conventional self threading screws are used to penetrate the seals and provide a firm holding power on the seals. The retention means 48.1 comprises a single self-tapping screw per corner junction 24, and serves the dual purpose of locating the seal in position while keeping the number of screws to a minimum. Installation of the seals is simplified. The labor savings resulting from the ease of installation of the seals and the retention screws, and the ease of replacement, reduces the cost of manufacture and can decrease delivery time.

Applicant was surprised that retention means in the form of self-tapping or threading screws could be used for the purpose disclosed. Applicant believed that such screws would weaken the seals and that the tendency to leak at the penetration points would be great. Surprisingly, the elastomer materials of the seals create tight seals along the retention means 48 and test have shown that leaks are unlikely in these regions. In addition, the retention means 48.1 create effective seals at the junction zones of the circumferential and longitudinal seals thereby resisting leakage in the corner junction zones 24. In fact the retention means 48.1 reinforce the seals in the leak sensitive corner or junction zones 24 and do not appear to have any harmful effect on the sealing properties of the seals.

Each clamp member 12 further has circumferentially extending heat protection grooves 52 provided in the inner surfaces of the flanges 26.

The circumferentially extending heat protection grooves 52 are provided between the circumferential grooves 16 and the axial ends of the clamp members 12. The heat protection grooves are clearly visible in FIGS. 3 and 4 of the drawings.

Figure 3:
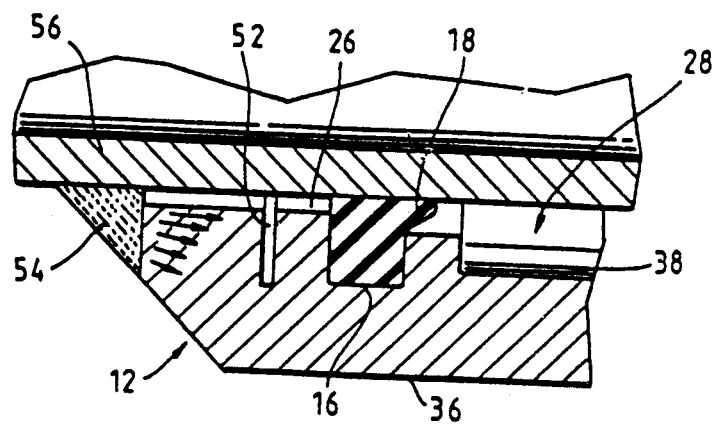
FIG. 3 shows a fragmentary, sectional view, to an enlarged scale, of the clamp of FIG. 2, along line III—III thereof.
Figure 4:
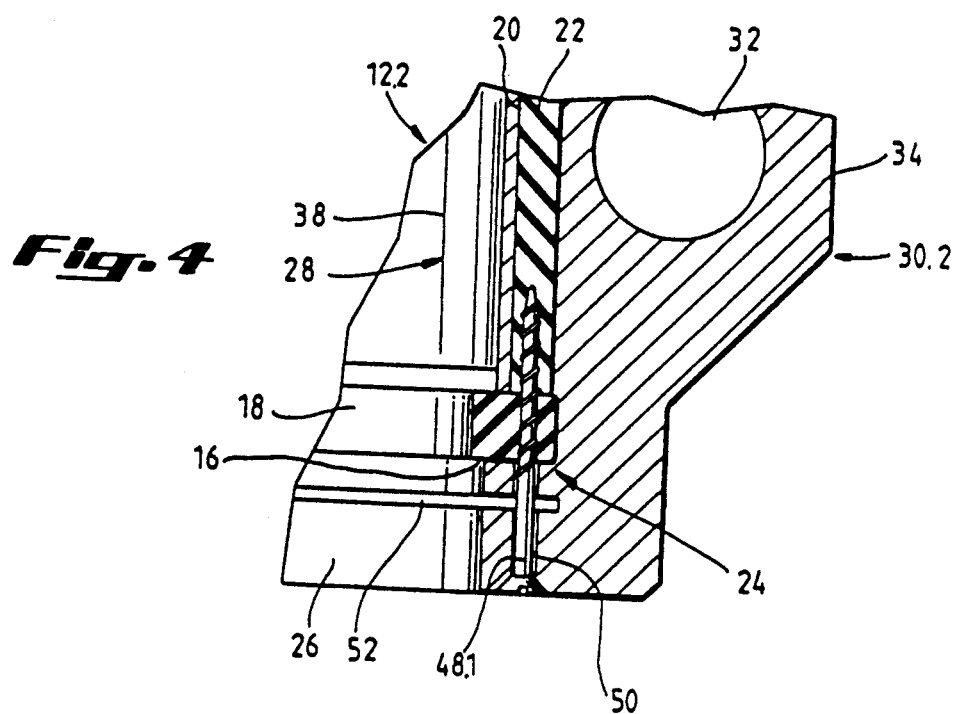
FIG. 4 shows a fragmentary, sectional view, to an enlarged scale, of the clamp of FIG. 2 along the line IV—IV thereof.

The purpose and function of the heat protection grooves 52 is demonstrated more particularly with reference to FIG. 3 of the drawings.

The repair clamps of this invention are often welded to a pipeline section once they have been mounted in position. At the same time the clamp members 12 are welded together. The clamp 10 thus becomes a permanent part of the pipeline section to which it is welded. The sealing reliability of the repair clamp it is thus no longer dependent upon the sealing effect of the elastomer seals 18 and 22.

In FIG. 3 a typical weld 54 is shown welding the axial end of the clamp member 12 to a high pressure pipeline section 56.

During the welding operation, heat is generated. If the quantity of heat which is conducted along the flange 26 towards the circumferential seal 18, becomes excessive, the seal 18 can lose its sealing effect during the welding operation. During the welding operation, fluids are conveyed through the pipeline 56 to dissipate heat generated during welding. Deterioration of the seal 18 is undesirable and can thus be harmful if it occurs during the welding operation. It can also, of course, be dangerous if combustible materials are be conveyed in the pipeline section 56.

The heat protection groove 52 interrupts the heat flow path thereby limiting the quantity of heat conducted from the weld zone 54 to the circumferential seal 18 during welding.

The heat protection groove 52 conveniently has a width of about ¼", and a depth generally corresponding to the depth of the circumferential seal grooves 16.

The heat protection groove 52 provides advantages over the prior art systems of increasing the axial widths of the flanges 26 by about 3 inches to absorb the heat generated and thus protect the seals. The heat protection grooves 52 do not add to the weight of the clamp 10 and provide a more effective barrier to the transfer of heat than additional material in the clamp members 12.

The clamp 10 includes a plurality of corner seals 58. The corner seals are illustrated in detail in FIGS. 5 and 6 of the drawings. For the sake of clarity, the corner seals 58 have been omitted from FIG. 1 and from FIG. 4.

Figure 5:
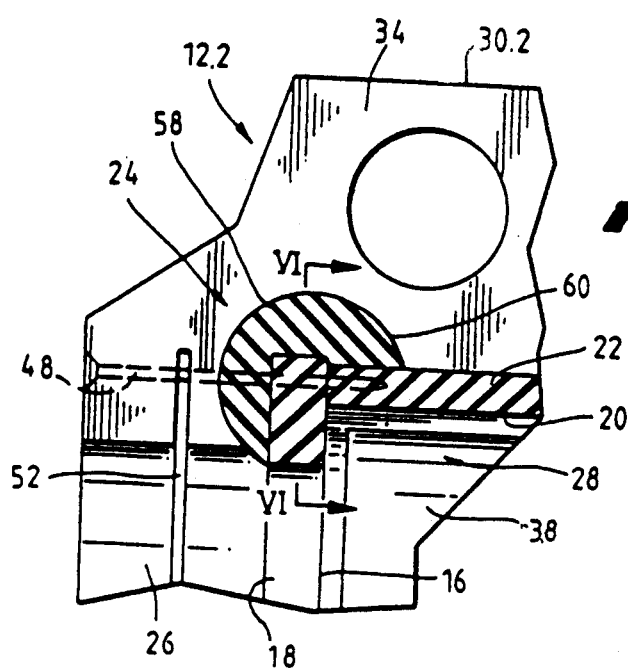
FIG. 5 shows a fragmentary plan view of the clamo in accordance with this invention having corner seal means.
Figure 6:
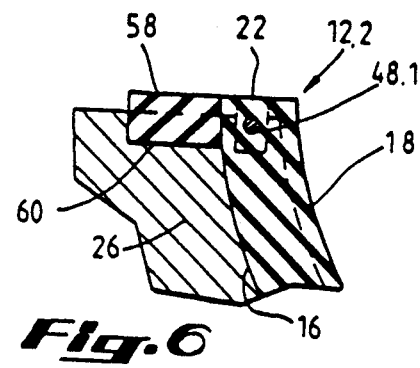
FIG. 6 shows a sectional side elevation of the clamp member of FIG. 5, along line VI—VI of FIG. 5.

With particular reference to FIGS. 5 and 6 of the drawings, therefore, four corner seals are provided on the clamp member 12.2 at the four corner junction zones 24. The corner seals 58 are positioned in the appropriate recesses 60 in the sealing face 34. The recesses 60 communicate with their adjacent circumferential seal grooves 16 and longitudinal seal grooves 20.

Each corner seal 58 is shaped to be located in its recess 60, and to embrace the adjacent circumferential seals 18 and longitudinal seals 22 where they join at the corner junction zones 24.

The corner seals 58 are positioned so that the retention means or self-tapping screws 48.1 also pass through the corner seals 58 before penetrating and passing through the circumferential seals 18, and then penetrating the longitudinal seals 22. The retention means 48.1 thus serve to additionally locate the corner seals 58 in position, and to secure them to the seals 18 and 22.

The junction zones 24 are the most sensitive zones for sealing reliability in repair clamps. These are the areas where leaks are most likely to occur because the longitudinal seals abut the circumferential seals in these areas. In addition, in these junction zones, seal-to-seal contact occurs during use, as opposed to seal-to-metal contact. The clamp members 12 are specifically designed to provide seal-to-metal contact in most areas. That is why the longitudinal seals 22 are provided on the clamp member 12.2 only, so that they can co-operate with the sealing faces 34 of the clamp member 12.1.

The corner seals 58 do not eliminate the seal-to-seal contact, but completely surround the area in question with metal-to-seal contact. The corner seals 58 therefore provide a relatively reliable sealing geometry as a back up or secondary sealing system to the primary seal provided by the seals 18 and 22.

The corner seals 58 may conveniently be installed as circular pads which are located in the recesses 60 and are then cut so that they do not extend over the seal grooves 16 or 20 in the junction zones 24.

In practice, for average conditions, the longitudinal seals 22 and circumferential seals 18 would project about ⅛" or so above the surfaces of the clamp members. The recesses 60 are therefore conveniently made so that, upon proper compression during use, the corner seals will have compressed by about 30 to 40 percent of their original height.

Figure 7:
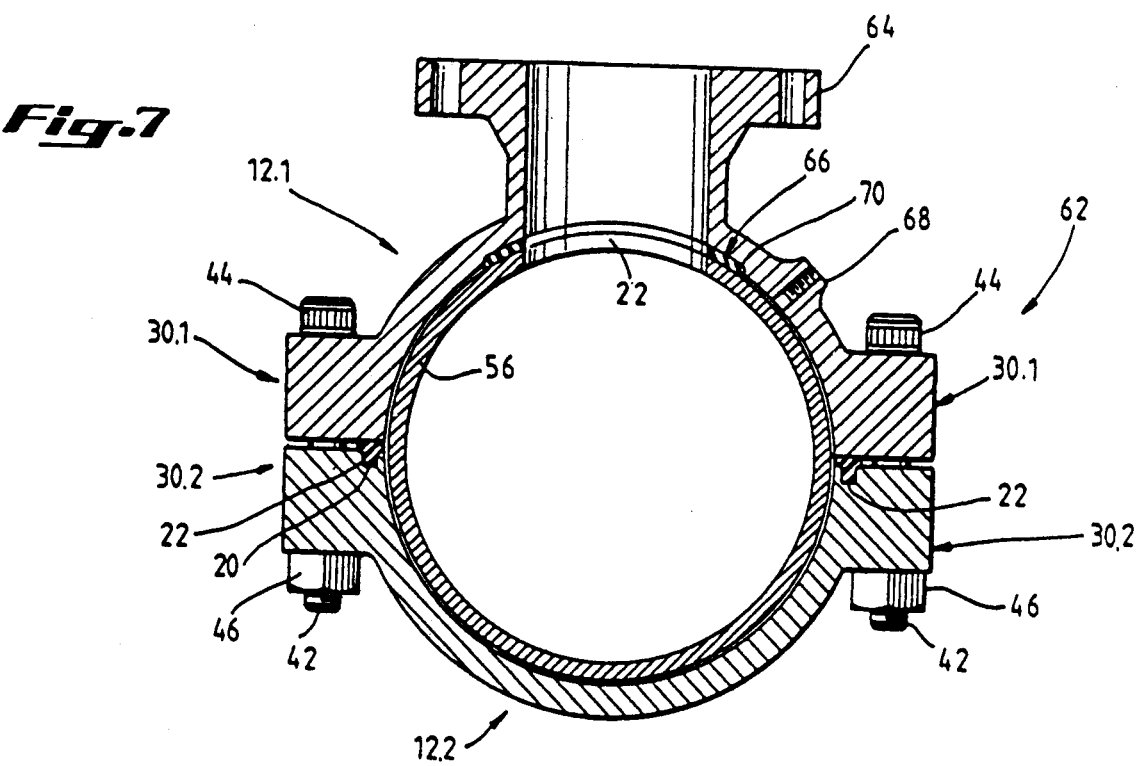
FIG. 7 shows a sectional end elevation, in the axial direction, of an alternative embodiment of the clamp of FIGS. 1—6, which is in the form of a tapping saddle or branch clamp.

With reference to FIG. 7 of the drawings, reference numeral 62 refers generally to an alternative embodiment of a clamp in accordance with this invention for forming a seal on a pipeline section.

The clamp 62 corresponds substantially with the clamp 10 of FIGS. 1-6. Corresponding parts are therefore indicated by corresponding reference numerals.

The clamp 62 is in the form of a tapping saddle or branch clamp which may be used to provide a tap into a pipeline section, or which may be used to provide such a tap when a repair is made.

The clamp member 12.1 of the clamp 62 has a pipe branch 64 extending thereform.

The clamp 62 includes an annular gasket 66 which is positioned within the clamp member 12.1 proximate the inner periphery of the pipe branch 64 to provide a sealing engagement with the pipeline section 56 during use as shown in FIG. 7.

The clamp 62 further includes a sealable test port 68 which is provided in the clamp member 12.1.

The annular gasket 66 is preferably made of a material which corresponds with that of the longitudinal and circumferential seals 22 and 18 as discussed in the specification. As such the gasket is pliable and tolerant to pipe dimensions and surface defects in the pipeline section.

The gasket is located in an annular gasket recess 70 along the inner surface of the clamp member 12.1.

Since the annular gasket 66 closely surrounds the tapping area once the tapped hole 72 has been formed in the pipeline section 56, access by the pipeline fluids to the exterior of the pipe section 56 will be restricted to the very small area around the tapped hole 72. The external surface of the pipeline section 56 is therefore protected by the annular gasket from any corrosive action of the pipeline fluids.

The clamp 62 provides a more important benefit in that it allows testing of the clamp 62 for sealing integrity prior to actual tapping of the pipeline section 56. By using the test port 68, hydrostatic pressure may be applied between the gasket 66 and the conventional circumferential and longitudinal seals of the clamp 62 to test the seals and verify that the seals are effective. This practically insures that no leakage will occur when the pipeline section 56 is tapped. Without the annular gasket 66 of the clamp 62, it is generally only possible to determine whether or not the conventional seals are effective once the tapped hole 72 has been formed and the fluid under pressure enters the interior of clamp 62. If a leak is detected at that stage, after the tapped hole 72 has been formed, it is a serious disadvantage.

The clamp 62 provides the further advantage that if a leak occurs in the clamp 62 sometime after installation, the test port 68 may be used to inject an appropriate sealant into the cavity defined by the outer periphery of the gasket 66, and by the outer peripheries of the longitudinal and circumferential seals 22 and 18. A leak may therefore be repaired without taking the pipeline out of service. This is generally not possible if no such annular gasket 66 is included, because the sealant will then flow into the bore of the pipe and will not be effective in sealing the leak.

Referring now to FIGS. 8-10, there is shown cross-sectional views of various repair clamps. FIG. 8 shows the basic body shape of a conventional repair clamp 70. Note that the clamp body bore 72.8 of the clamp 70 is basically circular. The dash lines displayed therein indicate the primary path of the wall tensile load centerline 74.8. It should be observed that a significant distance results between the bolt force centerline 42.8 and wall centerline 74.8 at the clamp seam 76.8 defined by the seating faces 34.8. Arrows (78.8) illustrate the off-set distance 70.8 between the wall centerline 74.8 and bolt centerline 42.8.

It will be appreciated that the product of the offset distance 78.8 and the tensile load along the bolt centerline 42.8 is the value of the bending moment induced in the shell of the clamp. Further, this moment is constant and continuous from one wide of the shell to the other. Therefore, where the off-set distance 78.8 is a large value, the bending moment is also a large value. Such large bending moments are undesirable in that these loadings must be resisted by the clamp body which leads to an increase in the body wall thickness or alternatively to the use of expensive stiffening ribs. Additionally, the clamp may not deflect significantly without endangering the loss of proper seal loading. Moreover, it is possible to design the clamp such that the stresses resulting from high bending loads are acceptable, while the deflections that result from the high bending cause leakage of the clamp. Excessive deflection of the clamp body induce high bending stresses in the bolts as well. High bending stresses in the bolts, since the bolts are generally seated on the side flanges which will deflect annularly with increases in clamp curvature deflection.

Therefore it is generally desirable to design a clamp which meets three criteria. That is, the clamp must meet at least the minimum acceptable criteria for clamp wall thickness, clamp body bending stress and bolt bending stress. This may be achieved in accordance with the present invention by adjusting the off-set distance 78 and the body wall thickness to achieve a clamp having a more desirable bending moment and having a decreased weight.

In general terms, the minimum criteria for clamp wall thickness may be computed according to accepted or standard codes such as, for example, the ASME codes or their equivalent for cylindrical vessels of the same diameter and material as the clamp body. AMSE, Section 8, Division 2 gives additional criteria for safe bending stress levels. Under these rules a basic stress allowable may be established for any material used. Furthermore, the allowable level of the sum of membrane (tensile) stress and bending stress is 1½ times the basic allowable stress. It will be appreciated that the bolting material will generally have a different limit of allowable stress than the clamp body since different materials are used and different methods exist for computing basic allowable limits for bolting than for vessel materials.

Once the basic allowable stresses are established, the allowable criteria for bending plus tensile stresses will result.

FIG. 9 displays a clamp 80 having an off-set distance 78.9 between the wall load centerline 74.9 and bolt force centerline 42.9. The clamp is composed of opposing clamp members 12.9 and 12.10. In that the off-set distance 78.9 is equal to 0, then the bending load or bending moment is equal to 0 because the bending moment is equal to the product of the off-set distance and the bolting force. Although the bending loads have been eliminated in clamp 80, this configuration is not the lightest possible since the side or bolting flanges 30.9 and 30.10 must be greatly increased in order to provide the necessary space for the bolting. It is thus better to have some bending moment than no moment. As the bolting flanges 30 are moved out away from the wall center line 74, the side flanges 30 may be shortened to accommodate the clamp wall 36, therefore resulting in a decreased clamp weight. However, as the off-set distance 78 is increased, bending loads become greater and thus the required wall thickness to resist the bending loads. Therefore, the off-set distance 78 must be optimized to achieve a minimized clamp weight.

It will be appreciated that although a fully minimized (minimum) clamp weight is generally preferred, it may nevertheless be desirable, for certain applications, to provide a clamp having a partially minimized weight (i.e., a partially optimized off-set).

In order to determine the optimum geometry (lightest weight), data processing, preferably in the form of a computer program, may be utilized to iteratively design a clamp. Such data processing is discussed in greater detail below.

FIG. 10 shows a typical clamp 82 made in accordance with the present invention. The clamp has a pair of complementary clamping members 12.11 and 12.12 to be clamped together to complete the clamp, each clamping member 12 having a clamp wall 38.11 and 84.12 defining an outer wall surface 86 and a curved inner wall surface 38.10. The clamp wall 84.12 defines a wall centerline 74.10 projected along a radial path extending from a mid point between the inner surface 38.10 and outer surface 86. It will be appreciated by those of skill in the art that the mid point referred to is not necessarily a geometrical mid point per se, rather this refers to a force mid point within the clamp wall 84. However, the wall load centerline 74 will follow a radial path which generally corresponds to the curvature of the curved inner wall surface 38.

Bolting or side flanges 30.11 and 30.12 are laterally spaced at opposed circumferential ends of the clamp wall 84 for use in bolting the clamping members 12.1 and 12.12 to complete the pipe clamp 82. Each bolting flange 30 has at least one bolt hole 32 for receiving a bolt 40, the bolt hole 32 defining a bolt force centerline 42, wherein the distance between the bolt force centerline 42 and the wall centerline 84 represents a centerline off-set distance 78.

It will be appreciated that by decreasing the off-set distance 78, a non-circular bore 72.10 or 72.9 will result. Such non-circular bore 72.10 is generally characterized by opposing curved inner wall surfaces 38.10 and 38.11 and opposed planar inner wall surfaces 88.10 and 88.11. However, such inner wall surfaces 88.10 and 88.11 are not necessarily planar. Therefore, such inner wall surfaces 88 may be defined more generally as an inner flange wall surface 88.

Therefore, it will be appreciated, that the present invention may be defined in terms of the shape of a cross-section of the clamp body bore 72, with the non-circular shape generally indicating an optimized clamp body shape. Moreover such shape may be further defined with reference to the relative distances between opposing clamp body inner wall surfaces 88.10 and 88.11 as compared to the distance between opposing curved inner wall surfaces 38.10 and 38.11, with the curved inner wall diameter being generally greater than the diameter between the planar, or alternatively, the flange inner wall surfaces 88.10 and 88.11.

In a preferred embodiment the distance between opposing curved inner wall surfaces 38.10 and 38.11 is at least 1% greater than the distance between opposing inner flange surfaces 88.10 and 88.11. A still more preferred embodiment may be realized by providing up to a 25% difference between opposing inner flange diameter and opposing curved inner wall diameter. It has been found that an optimized body shape for smaller clamps generally exhibits a greater difference between these distances than in larger clamps. For example, 2" clamps (that is, clamps designed for 2" pipes) have been prepared which exhibit a 25% difference. Moreover, 16" clamps made to the same specification were found to exhibit a 10% difference whereas 48" clamps may demonstrate only a 3%. However, optimized clamps made for different applications may vary.

Pipe clamps made in accordance with the present invention may similarly be defined by comparing the radius of the generally annular wall force centerline 74 to the radius (i.e., half) of the distance between opposing flange inner wall surfaces 88.10 and 88.11. Accordingly, the wall centerline radius may be defined as by the radius of the annular wall force centerline 74.10. Thus, the advantages of the present invention may be realized by maintaining the radius of the distance between opposing flange inner wall surfaces 88.10 and 88.11 at a value which is less than the wall centerline radius.

In a preferred embodiment the flange radius is within 1% less than the wall centerline radius.

In a more preferred embodiment the flange radius is within 5% less than the wall centerline radius.

In still more preferred embodiment, the flange radius can be 25% less than the wall centerline radius.

It can be appreciated from the foregoing that an important part of the present invention is the clamp weight optimization which is achieved by varying tensile load off-sets 78.

Figure 11:
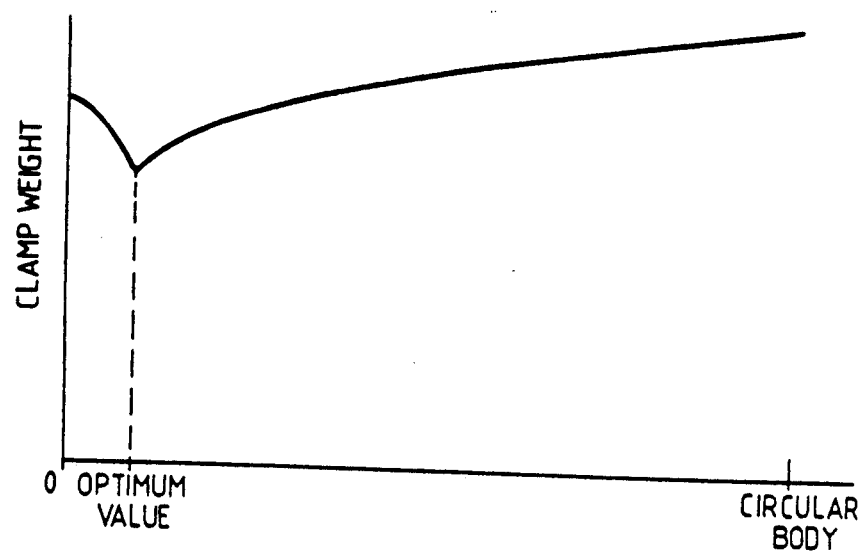
FIG. 11 is a graphic display of changes in the clamo weight achieved by varying the force centerline off-set, and particularly demonstrates the existence of a minimum clamp weight achieved at an optimum off-set value.

FIG. 11 illustrates a chart which demonstrates the advantages which may be realized. Shown therein is a graphical display of changes in clamp weight (along the Y) axis versus changes in off-set distances (along the X axis). It is particularly noteworthy, and particularly surprising, that a unique optimum off-set dimension exists. As illustrated, an off-set distance of zero results in a clamp weight which is somewhat greater than the clamp weight achievable at the optimum off-set distance value. The totally circular body of the conventional repair clamp (for example see FIG. 8) gives a clamp of high weight relative to both the optimum off-set distance and the zero off-set distance.

In order to generate the optimization data as generally illustrated by FIG. 11, it is preferable to utilize data processing, preferably in the form of a computer software program.

FIG. 12 illustrates a logic circuit for minimization of clamp weight. Those of skill in the art will recognize that such logic circuit may be adaptable by those of skill in the art to perform within the framework of a computer software program. However, it is not absolutely necessary to utilize computer software, as calculations for the various stresses, deflections and physical dimension may be achievable by non-software related means, such as manual calculation. However, it will be generally recognized that computer software has the advantage of being much less time consuming and potentially more accurate, in arriving at proper optimized clamp dimensions.

In a very general manner, the logic circuits of FIG. 12 iteratively designs a clamp. The program starts by designing for the case where there is no off-set (i.e., off-set equals zero). The logic circuit computes all of the appropriate parameters for the clamp design and then computes the weight. The program then increases the off-set dimension by a small increment and completes the process again. After each design iteration, the following weight is compared to the weight for the preceding step. As long as the weight continues to decrease, the process is repeated. After a sufficient number of times, a minimum clamp weight will be found. Such an iterative logic circuit can be used to demonstrate the finding that a unique optimum off-set dimension does exist and that this optimum can be approached "smoothly" by the logic circuit (i.e., no radical changes in the weight were observed with small changes in the off-set dimension). These conditions were successfully met and therefore the procedure works effectively at finding an optimized geometry for any given clamp design requirement.

In particular, the logic circuit of FIG. 12 begins at input block 90 by inputting the pipe size 92 (in terms of the pipe's outer diameter) and the sealing length 94, which is the minimum distance between the laterally spaced circumferential seals 18 which will accommodate, for example, a hole in the pipeline to be repaired. Additional inputs include the pressure rating 96 of the clamp to be produced and the number of bolts 98. The number of bolts is generally based upon the determined bolt area requirements and by the preference of the designer. In practice, a reasonable number of bolts can be selected. Once the minimized weight has been determined, the number of bolts can be varied to alter the diameters of the individual bolts. This will alter the bolt centerline position. The minimized weight can then again be determined and so on until the best number of bolts to give the best weight has been determined. The print key is set to 0 as an internal counter.

After inputting the four above-mentioned variable inputs, the logic circuit then proceeds to logic box 100 which computes the clearance of the sealing flange inner wall surfaces 14 over the pipe to be repaired. Generally, for example, a 3/16" inch clearance is typical for a 4" pipe. However, formulas which take into account potential pipe expansion and unevenness may be used to generate such clearance data, and such formulas are well-known to those skilled in the art of clamp manufacturer. Generally, the clearance may be set at the maximum acceptable tolerance of the pipe. In a preferred embodiment, the clearance is set at twice the maximum acceptable tolerance.

The next logic step 102 involves locating the longitudinal seal along the seating face 34 of the clamp member 12 in line with the positioning of the ends of the circumferential seals 18.

Next, at logic circuit box 104, the pressure loading on the clamp is determined with reference to American Society of Mechanical Engineers (ASME) codes. In particular, gasket retention loading must be sufficient to produce enough squeeze on the seal to maintain the pressure. Thus the pressure applied over the rectangular area as defined by a cross-section of the clamp load bearing cavity (ie- the cross sectional area sealed as defined by the outer edges of the longitudinal and circumferential seals) defines the total load and therefore determines bolt loading which is also definable as the pressure loading.

At logic box 106, the cross-sectional bolt size necessary to counteract the pressure loading is established by the allowable tensile stress for the bolt material as determined from the pressure loading information at logic box 104. This is a generally standard computation known to those of skill in the art.

Logic circuit box 108 locates the bolt centerline 42 wherein the inner edge of the bolt hole is located just outside of the longitudinal seal.

Logic circuit box 110 sets the centerline of the body shell 74 equal to the bolt centerline 42 (therefore setting the off-set distance equal to 0).

Logic circuit boxes 112-120 are concerned with computing the physical dimensions of a clamp which meets minimum criteria for clamp wall thickness, clamp body bending stress and bolt bending stress. At box 112, the shell wall thickness is computed according to standards for clamp wall thicknesses necessary to meet specified pressure loadings. For example, Section 8, Division 1 of the ASME codes specifies the general rules relating to wall thickness for pressure vessels. However, other specifications may be referred to where appropriate. Accordingly, box 114 computes physical dimensions of a clamp having the selected off-sets and shell wall thickness. Such physical dimension computations include, for example, considerations of the fact that bolt nuts 46 will normally wedge against the outer clamp body 36 in order to obtain the maximum advantages of the present invention.

Logic circuit box 116 computes the internal stresses and deflections of the clamp having the physical dimensions previously determined. This includes, for example, the tensile stress on the body due to pressure. The bending stress on the body is determined by dividing the moment (the product of the load and the offset) in the clamp shell by the section modulus of the clamp, wherein the moment is equal to the pressure loading per each clamp member 12. The section modulus of bending is a conventional calculation whereby the shell is considered a beam.

Allowable tensile stress in the body may be determined with respect to ASME codes, Section 8, Division 2 which specifies more specific operating criteria. Whatever tensile stress allowable is determined to be appropriate with reference to the codes, the sum of the tension and bending stress is allowed to be approximately 1½ times greater. Therefore, whatever primary membrane allowable stress for the material is, 1½ times that allowable stress can be used for the sum of tension and bending stress. These are criteria for bending stress in the bolts and bending stress in the body.

The appropriate ASME codes are the codes currently preferred for determining the specified criteria.

At logic box 118 the stresses and deflections calculated at box 116 are checked against ASME standards, and if they do not the wall thickness is incrementally increased at box 120 and the computations of boxes 114-118 repeated.

Once a clamp which meets the specified minimum requirements is generated by boxes 112-120, the weight of the resultant clamp is computed at box 122. Logic box 124 is a print key test which is acuated only when a clamp of minimum weight is achieved.

At logic box 126 a further test is undertaken to determine if the weight of the clamp generated at the present iteration is less than the clamp achieved at the previous iteration. Basically, this test requires that the computations be continued until a clamp of minimum weight is achieved.

At logic box 128 the clamp weight of the present iteration is saved for comparison with the clamp achieved at the next iteration. At logic box 130 the off-set distance is incrementally increased and the next iteration is begun.

Iterations are continued until a clamp is generated which has a greater weight than the previous iteration (determined at box 126). When this occurs, the logic circuit drops back to the previous iteration which generated a clamp of decreased weight and the off-set distance is again set at the previous value at logic box 130 (wherein the print key is set equal to 1). During this final iteration, the print key test at box 124 is actuated and the design data printed at box 132.

Further modifications and alternative embodiments of the apparatus of this invention will be apparent to those skilled in the art in view of this disclosure. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all this would be apparent to one skilled in the art after having the benefit of this description of the invention.

What is claimed is:

1. A clamp for forming a seal on a pipeline section:
   (a) the clamp comprising at least two complementary clamp members to be clamped together on a pipeline section to complete the clamp;
   (b) each clamp member having an inner surface with a pair of axially spaced, circumferentially extending circumferential seals;
   (c) at least one clamp member having at least one longitudinal seal which extends axially to bridge the gap between a pair of circumferential seals and define two junction zones where the two circumferential seals and the longitudinal seal abut; and
   (d) retention means at each junction zone, each retention means penetrating at least one of the seals to connect the seals together in the junction zone.

2. A clamp according to claim 1, in which each retention means is connected to a clamp member to connect the seals with which it is engaged, to the clamp member.

3. A clamp according to claim 1, in which each retention means extends through one of the seals and penetrates the adjacent seal to connect them together.

4. A clamp according to claim 3, in which each retention means comprises a self tapping screw which extends through one seal and is screwed into the adjacent seal.

5. A clamp according to claim 4, in which the clamp member has bores through which the screws extend to thereby secure the seals with which they are engaged, in position on the clamp member.

6. A clamp according to claim 5, in which the seals are located in seal grooves in the clamp members.

7. A clamp according to claim 1, including at least one additional retention means which is connected to one clamp member and penetrates one of the seals in a connection zone to connect that seal to the clamp member in that connection zone.

8. A clamp according to claim 7, including a plurality of additional retention means which connect the seals to their respective clamp members in a plurality of connection zones.

9. A clamp according to claim 1, comprising a pair of clamp members to be clamped together on a pipeline section to complete the clamp, one clamp member having a pair of circumferentially spaced, axially extending longitudinal seals positioned to bridge the gap between the circumferential seals at the opposed ends of the circumferential seals to define four junction zones, and four retention means which are connected to the clamp member and connect the seals together at the junction zones to connect the seals to the clamp member at the junction zones.

10. A clamp according to claim 9, which is in the form of a high pressure pipeline repair clamp and which includes additional retention means which are engaged with the other clamp member and with the circumferential seals of that clamp member by penetrating them to connect them to the clamp member.

11. A clamp according to claim 1, in which the clamp member includes clamping flanges which extend from opposed ends of the clamp members for use in clamping the clamp members together to complete the clamp.

12. A clamp according to claim 11, in which each clamp flange has at least one bolt hole for receiving bolt means for bolting the clamp members together, and including bolt means having socket heads.

13. A clamp according to claim 1, in which the clamp members have heat protection grooves in their inner surfaces between the peripheral axial edges of the clamp members and the circumferential seals to protect the circumferential seals from heat flow toward the seals during welding of such peripheral axial edges.

14. A clamp according to claim 1, having corner seals positioned to abut the junction zones and provide secondary sealing for the junction zones during use.

15. A clamp according to claim 14, in which the corner seals are located in corner recesses provided in the clamp member which has the junction zones.

16. A clamp for a tubular member, the clamp having an inner wall surface, having a seal groove in the inner wall surface to house seal means, the seal groove being spaced from a peripheral zone of the clamp, and the clamp having a radially extending heat protection groove separate from the seal groove, the heat protection groove being provided in the inner wall surface and spaced between the peripheral zone of the clamp and the seal groove to interrupt heat flow from the peripheral zone to the seal groove to thereby partially protect seal means when used in the seal groove during use, against heat flow from the peripheral zone during welding thereof.

17. A clamp for pipeline repair, the clamp comprising a plurality of clamp members to be clamped to each other about a pipeline to be repaired to complete the clamp, each clamp member having a sealing zone for receiving seal means and each clamp member having a radially extending heat protection groove that is separate from the sealing zone and spaced between the sealing zone and a peripheral zone to the sealing zone during welding of the peripheral zone and thereby provide protection for seal means when positioned in the sealing zone.

18. A clamp according to claim 17, in which each clamp member has an inner wall surface, in which each sealing zone comprises a sealing groove in the inner wall surface for housing seal means, and in which each heat protection groove is provided in the inner wall surface.

19. A clamp according to claim 10, in which each clamp member is curved, in which each clamp member has a pair of axially spaced, circumferentially extending sealing grooves spaced inwardly of its axially directed peripheral edges, and in which each clamp member has a circumferentially extending heat protection groove between each sealing groove and its adjacent clamp peripheral edge.

20. A clamp according to claim 18 or claim 19, in which heat protection grooves have depths generally corresponding to the depths of the sealing grooves.

21. A clamp for forming a seal in a pipeline section:
(a) at least one clamp member having at least one longitudinal seal which extends axially to bridge the gap between the ends of a pair of circumferential seals and define two corner junction zones;
(b) at least one clamp member having at least one corner seal positioned to abut a junction zone during use and provide back-up sealing for the junction zone when the clamp is completed during use.

22. A clamp according to claim 21, in which the clamp member having the corner junction zones has a corner seal positioned at each corner junction zone.

23. A clamp according to claim 22, in which each corner seal is positioned to embrace the outwardly directed edges of the seals in the corner junction zones.

24. A clamp according to claim 22 or claim 23, in which each corner seal is located in a corner recess provided in the clamping member.

25. A clamp according to claim 24, in which each corner recess has a depth in relation to the thickness of its cover seal, to provide for 30 to 40% compression of the corner seal when the clamp is completed.

26. A clamp according to claim 22, having a pair of clamp members, and having a pair of longitudinal seals to define four carrier junction zones, and having a corner seal positioned at each corner junction zone.

27. A clamp according to claim 26, in which the pair of longitudinal seals are provided on one of the clamp members, and in which all four corner seals are provided at the corner junction zones of that clamp member to clamp is completed in use.

* * * * *

UNITED STATES PATENT AND TRADEMARK OFFICE
CERTIFICATE OF CORRECTION

PATENT NO. : 5,004,275

DATED     : April 2, 1991

INVENTOR(S) : Jack E. Miller

It is certified that error appears in the above-identified patent and that said Letters Patent is hereby corrected as shown below:

In claim 19, column 20, line 20, delete --10-- and insert therefor "18".

Signed and Sealed this

Fifteenth Day of September, 1992

Attest:

DOUGLAS B. COMER

Attesting Officer

Acting Commissioner of Patents and Trademarks